United States Patent [19]

Banker

[11] Patent Number: 5,296,647
[45] Date of Patent: Mar. 22, 1994

[54] ASSEMBLY FOR CONNECTING AN ELECTRICAL BOX TO A PLATE WITH A BIMETALLIC FLANGE

[75] Inventor: John G. Banker, Louisville, Colo.

[73] Assignee: Explosive Fabricators, Inc., Louisville, Colo.

[21] Appl. No.: 782,510

[22] Filed: Oct. 25, 1991

[51] Int. Cl.⁵ .................... H01H 9/02; H02G 3/08
[52] U.S. Cl. .................................. 174/58; 220/3.5
[58] Field of Search ............ 228/107; 439/535, 566, 439/536; 174/48, 53, 58; 200/296, 297; 220/3.5, 3.9; 248/27.1

[56] References Cited

U.S. PATENT DOCUMENTS

| | | | |
|---|---|---|---|
| 1,776,146 | 9/1930 | Carlson | 174/58 X |
| 3,614,827 | 4/1969 | Knop et al. | 228/107 X |
| 4,193,529 | 3/1980 | Dick et al. | 228/107 X |
| 4,458,924 | 7/1984 | Schlicht | 164/99 |
| 5,018,397 | 5/1991 | Matich | 248/27.1 X |

Primary Examiner—Timothy V. Eley
Assistant Examiner—Khan V. Nguyen
Attorney, Agent, or Firm—Richard W. Hanes

[57] ABSTRACT

A recessed electrical box and bimetallic flange for attaching the box to a bulkhead plate comprising a flange having a first portion of metal compatible for welding to the box and a second portion of metal compatible for welding to the bulkhead plate wherein said first and second portions are metallurgically bonded together.

8 Claims, 2 Drawing Sheets

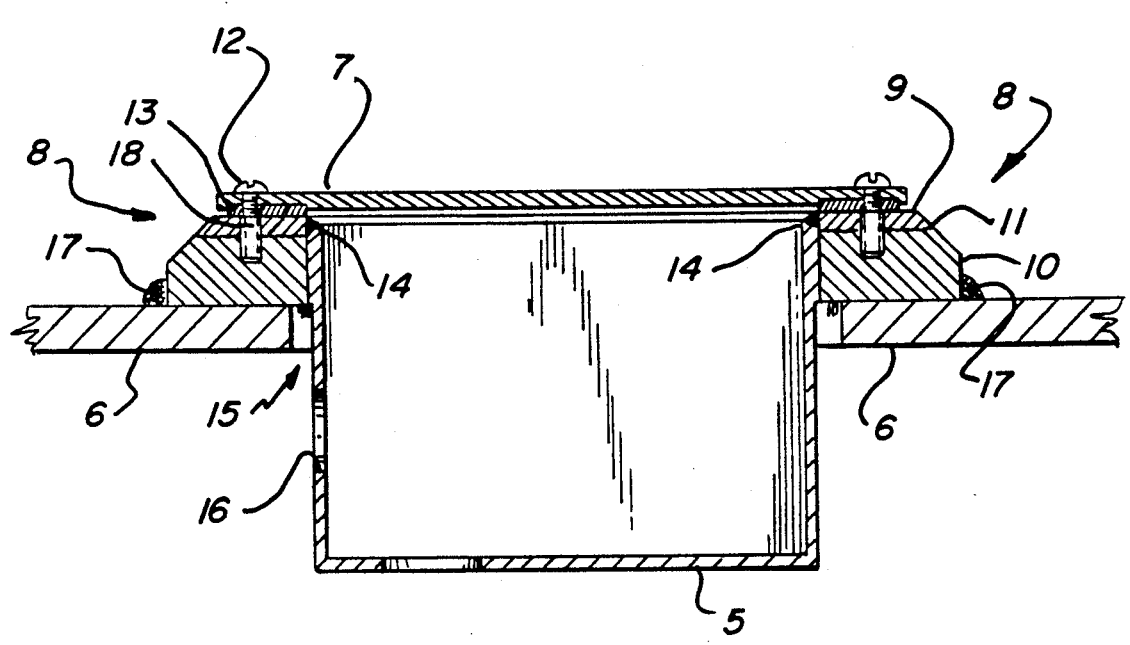
Fig_1
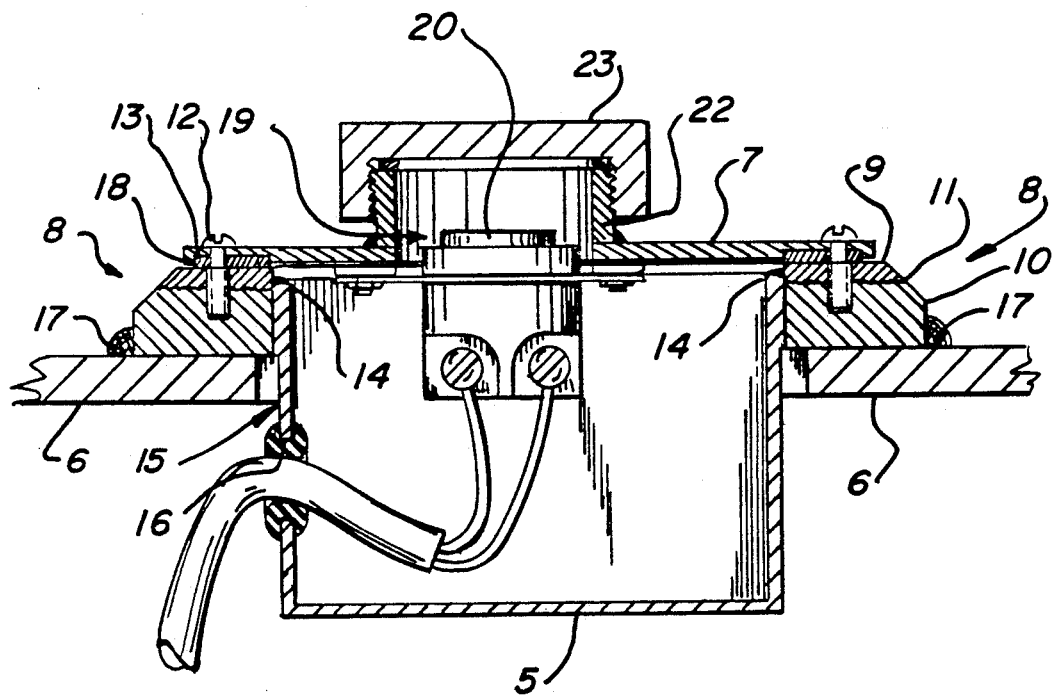
Fig_2

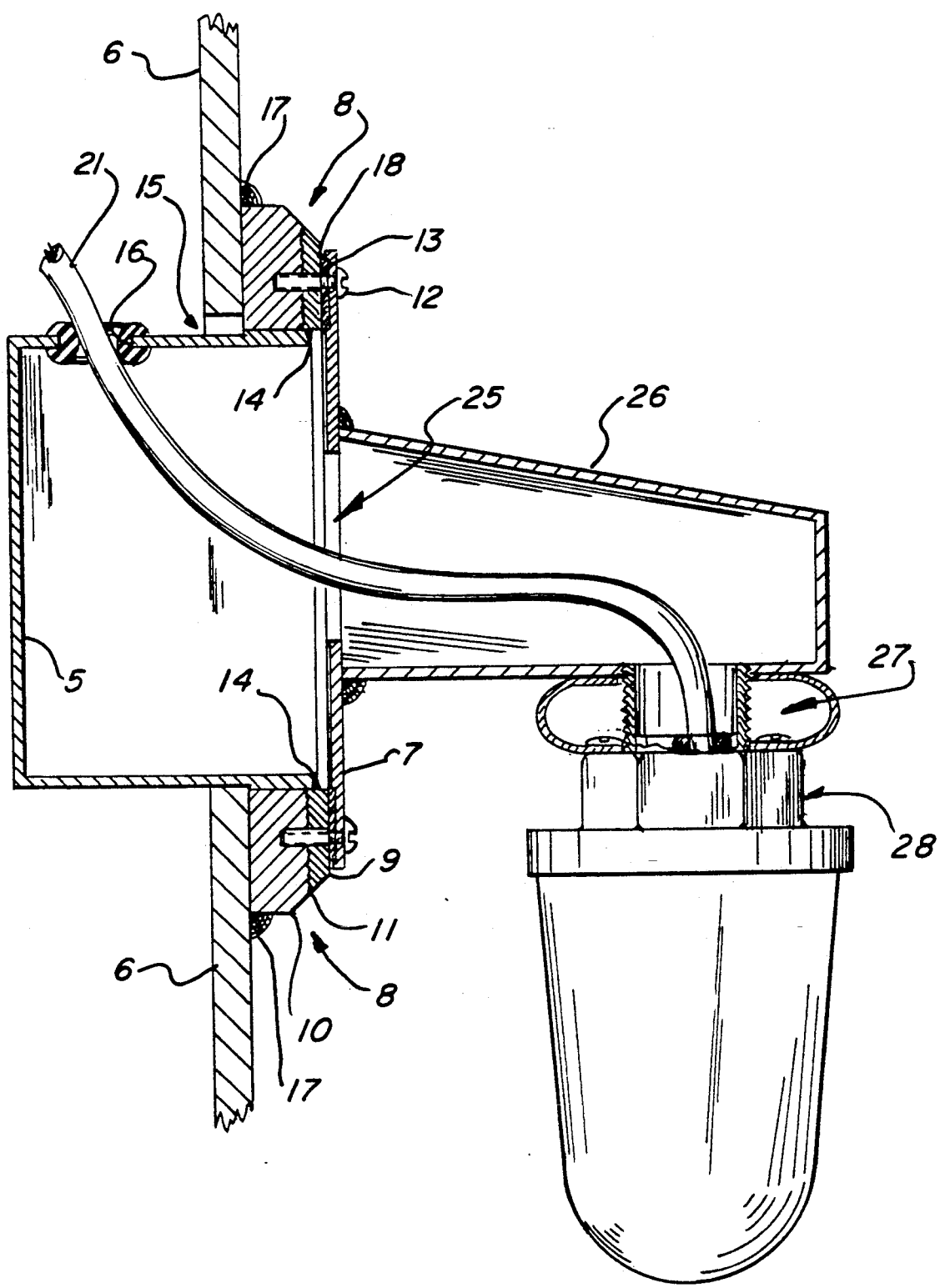
Fig_3

ASSEMBLY FOR CONNECTING AN ELECTRICAL BOX TO A PLATE WITH A BIMETALLIC FLANGE

BACKGROUND OF THE INVENTION

The invention relates to an exterior electrical box for use in particular on ships. A corrosion resistant bimetallic mounting flange and electrical box and the method of making the same by explosive bonding is disclosed.

In the topside environment of sea going vessels extreme seawater induced corrosion problems exist. Moreover, if the metals used for construction of ship parts are galvanically dissimilar and/or if there are crevices between metal components, the corrosion problems are aggravated.

Corrosion problems are especially recurrent in shipboard electrical boxes as where maintenance requirements necessitate that the box covers be periodically removed, creating crevice problems in and around the box covers. Most of the general corrosion problems on a ship and the crevice caused corrosion around electrical box covers can be eliminated through the use of corrosion resistant materials, such as brass or MONEL for the box and cover.

Brass and MONEL however are difficult to use as they present attachment problems. On ships the common bulkhead materials are aluminum and steel. Since neither brass nor MONEL can be welded effectively to either the aluminum or steel, the boxes must be bolted to the ship's structure. Dissimilar metal and crevice corrosion is then created at the junction between a box and the bulkhead to which it is attached.

In shipboard electrical systems, electrical components frequently require EMI/EMP protection, and shielding is required of the wires and the points where the wires enter the electrical boxes. All the electrical components, including the shielded layers, must be electrically bonded. Corrosion between components in shipboard structures can interfere with electrical continuity, making it necessary to protect the components of the electrical system from corrosion so that the shielding and bonding mechanisms are not subject to environmental damage. All of these concerns are diminished if the electrical box containing the electrical components is recessed into the bulkhead structure. But on shipboard, particularly in the topside environment, electrical boxes are typically surface mounted and exposed to the sea environment. They cannot be recessed into the bulkheads because of the lack of weldability between the brass or aluminum box and the steel bulkhead structure.

In addition to the corrosion problems which are inherent with such a system, winter topside icing exacerbates the dilemma of surface mounted electrical boxes when the boxes are knocked off the walls by de-icing procedures.

Metallurgical bonding techniques such as explosion bonding have been used in the past to alleviate the corrosion concerns of a shipboard environment. U.S. Pat. No. 4,934,952 discloses the use of explosion bonded dissimilar metallic components for use in a corrosive environment. The patent, in particular, is directed to a corrosion resistant bonding strap.

U.S. Pat. No. 3,137,937 discloses a general process for explosion bonding of dissimilar metals.

It is therefore the primary object of the present invention to provide an electrical box in which the cover and the cover mounting flange are similar, non-corrosive metals which will avoid corrosion in the gap between the cover and the flange.

A second object of this invention is to provide a bimetallic flange for the electrical box which will serve the first object and at the same time provide a second metal which is weldable to the structure to which the electrical box will be attached and which will present no gap or crevice between the two dissimilar metals which will foster galvanic corrosion.

SUMMARY OF THE INVENTION

The invention comprises an electric box and bimetallic flange for attachment to metallic ship structures such as a ship's bulkhead.

The box and flange comprise a box portion of corrosion resistant metal and a bimetallic flange connected thereto. The flange has a first portion of the same metal as the bulkhead or ship's structure or plate to which it is to be attached for ease of welding. A second portion of the flange is of the same metal as the electrical box for ease in welding thereto. The first and second portions of the flange are metallurgically bonded together by any well known method, although explosion bonding is preferred. The bimetallic flange allows the box to be recessed in the bulkhead or ship's structure to which it is attached.

The invention also comprises a bimetallic flange for connecting an electrical box of a first metal to a ship's structure of a second metal, and the method of making such a flange by the use of explosion bonding.

BRIEF DESCRIPTION OF THE DRAWINGS

FIG. 1 is a cross-sectional view of the electrical box and flange in accordance with the instant invention.

FIG. 2 is a cross-sectional view of the electrical box and flange showing an electrical receptacle mounted in the box with an external support tube and for mounting a covering cap.

FIG. 3 is a cross-sectional view of the electrical box and flange showing a tubular light fixture supporting structure externally mounted on the box cover.

DETAILED DESCRIPTION OF THE DRAWINGS

In the drawing reference numeral 5 generally refers to a recessed terminal box. In the preferred embodiment, the basic box structure is of corrosive resistant monel. Other corrosion resistant metals, such as titanium, copper-nickel, brass, inconel, aluminum and stainless steel could also be used for the box and the flange face construction as will be later described.

The box 5 is provided with a cover 7 of the same or compatible material as the box body. Compatible metals are those which are galvanically similar to each other and thus do not induce galvanic (dissimilar metal) corrosive action.

A bimetallic flange 8 is used to connect the electrical box 5 to the ship's structure 6 to which it is to be attached. In the preferred embodiment, the ship's structure is a bulkhead plate of steel, although the electric box and flange of the instant invention can also be used in other locations and for attachment to other metals such as aluminum.

The bimetallic flange 8 of the instant invention has a first portion or face portion 9 of the same metal or compatible metal as the box body 5. In the preferred example, the face portion 9 is of corrosive resistant MONEL.

The face portion 9 can thus be readily welded to monel box body 5 as shown at 14.

The bimetallic flange 8 also includes a bottom portion 10 of the same metal or a compatible metal as the bulkhead plate 6. In the preferred examples, the bottom portion 10 is of steel if the bulkhead 6 is of steel. Thus, the bottom portion 10 of flange 8 can be readily welded to the ship's structure or bulkhead 6 as shown at 17.

The face or top portion 9 and the bottom portion 10 form a bimetallic flange. The two portions 9 and 10 are metallurgically bonded together. Any well known method for bonding, such as roll bonding or friction welding, can be used, though in the example explosion bonding is preferred.

To bond the dissimilar metals of the flange together by explosion bonding, the portions 9 and 10 are initially spaced from each other. One surface of one of the metals is then covered by explosive material. Upon ignition and detonation of the explosive material, the two dissimilar metals and the two portions are forced together under pressures of several million pounds per square inch, resulting in the formation of a metallurgical bond stronger than the weaker metal in the system. During bonding, a jetting phenomenon occurs which removes oxides and foreign material from the surfaces to be joined, creating conditions which result in metallurgical bonding.

The electrical box 5 of the preferred embodiment is recessed in bulkhead plate 6. Cover 7 is preferably of the same material as the body of the box 5. In the preferred embodiment, the cover 7 is of MONEL, although other corrosive resistant materials can be used. The cover 7 is attached to the flange 8 by a cap screw or bolt 12, also preferably of MONEL. A well known nylon locking insert 18 can be used as a locking device. Other well known methods of attaching the cover 7 can also be used as long as the method selected minimizes corrosion. A gasket 13 is used to achieve a positive seal between the cover 7 and the flange 8. The gasket 13 is preferably of a common gasket material impregnated with MONEL fibers for conductivity, although other well known conductive materials can be used.

The box 5 is provided with electrical feed openings 16 where required and in the number desired. Because the box 5 is recessed and inside the EMI/EMP boundaries and away from the topside corrosive environment, the design and maintenance of wire systems is simplified. The cables which enter the box do not require external corrosion resistant quality EMI shielding.

The bimetallic flange 8 permits full welding of the box into the ship structure while providing structural reinforcement around the penetration of the bulkhead plate. Thus, the flange 8 reinforces the cut out in the bulkhead plate 6. The explosion bond eliminates crevices at the bi-metal connection and thus prevents corrosion. Overall topside maintenance is reduced by the use of the recessed box and flange.

Penetrations and attachments may be made as needed to support topside electrical component accessories, as shown in FIGS. 2 and 3.

FIG. 2 depicts the use of the box with a topside quality electrical outlet. Aperture 19 is cut through the box cover 7. An appropriate electrical outlet 20 is installed inside of the box and connected to the wiring coming from inside of the ship 21. A threaded support fitting 22 is welded to the face of the box 7 around the perimeter of the cover aperture, creating a weather seal. A threaded, removable cover 23 is used to seal the outlet when not in use.

FIG. 3 depicts the use of the box 5 with a topside light fixture. A penetration or aperture 25 is cut through the box cover 7. A sealed lamp support fixture 26 constructed of a metal galvanically similar to the cover is welded to the face of the cover, creating a weather seal therebetween. A flexible similar metal component, such as a bellows 27 welded to the support fixture, provides a shock compensating, EMI shielded, corrosion resistant connection between the support fixture and a standard shipboard lamp fixture 28. Electrical wiring coming from inside the ship 21 is routed through the box, support fixture, and bellows for connection to the lamp fixture.

Although the examples show only electrical outlets and lamps, any other required electrical component may be connected through the box of this invention. Examples include, but are not limited to, switches, telephones, search lamps, video cameras. Although the preferred embodiment has been described using MONEL, it is noted that other corrosive resistant materials could also be successfully used.

It is claimed:

1. A combination of an electrical box, a metal plate and a bimetallic flange assembly comprising:
   a) a box having a bottom and at least one side wall, wherein said box is of a first metal, and said at least one side wall has a first portion and a second portion;
   b) a plate having a top surface, wherein said plate is of a second metal different than said first metal,
   c) an aperture in said plate sized to receive said box wherein said box is partially recessed in said aperture with the first portion of said at least one side wall extending through said aperture and the second portion of said at least one side wall extending above said top surface of said plate,
   a bimetallic flange surrounding said second portion of said at least one side wall of said box to reinforce said aperture in said plate, said bimetallic flange having a first layer of a third metal galvanically compatible with said box wherein said first layer of said flange is welded to said box,
   said bimetallic flange further comprising a second layer of a fourth metal galvanically compatible with said second metal of said plate wherein said second layer of said flange is welded to said plate,
   a metallurgical bond between said first and second layer of said flange.

2. The combination of claim 1 wherein, said third metal of said first flange layer is materially the same as of said first metal of said box.

3. The combination of claim 1 wherein said fourth metal of said second flange layer is materially the same as of said second metal of said plate.

4. The combination of claim 2 wherein said box and said first flange layer are formed of MONEL.

5. The combination of claim 3 wherein said second flange layer and said plate are formed of steel.

6. The combination of claim 3 wherein said second flange layer and the plate are formed of aluminum.

7. The combination of claim 1 and further including a removable cover for said box, and means for removably mounting said cover on said flange.

8. The combination of claim 7 wherein the cover contains an aperture having a perimeter and further including tubular support means sealably attached to the said perimeter for supporting accessory devices external to the box.

* * * * *